Nov. 3, 1931.  G. H. HARTMAN  1,830,697
OIL DISPENSING MECHANISM
Filed Dec. 20, 1930  5 Sheets-Sheet 1

Inventor:
George H. Hartman,
Bair, Freeman & Sinclair
Att'y.

Nov. 3, 1931.  G. H. HARTMAN  1,830,697
OIL DISPENSING MECHANISM
Filed Dec. 20, 1930  5 Sheets-Sheet 2

Inventor:
George H. Hartman,
Bair, Freeman & Sinclair
Att'y.

Nov. 3, 1931.  G. H. HARTMAN  1,830,697
OIL DISPENSING MECHANISM
Filed Dec. 20, 1930  5 Sheets-Sheet 3

INVENTOR

Nov. 3, 1931. G. H. HARTMAN 1,830,697
OIL DISPENSING MECHANISM
Filed Dec. 20, 1930   5 Sheets-Sheet 4

Patented Nov. 3, 1931

1,830,697

UNITED STATES PATENT OFFICE

GEORGE H. HARTMAN, OF BRYAN, OHIO, ASSIGNOR TO THE ARO EQUIPMENT CORPORATION, OF BRYAN, OHIO, A CORPORATION OF OHIO

OIL DISPENSING MECHANISM

Application filed December 20, 1930. Serial No. 503,726.

The invention relates to oil dispensing mechanism, and in particular to mechanism for delivering measured quantities of oil into the crank case of an automobile engine. At the present time oil is generally put into glass jars and held in readiness for delivery to the crank case of the engines. This involves a lot of work, dirt can collect in the oil, and the customer is seldom sure that the particular jar from which oil is being delivered to his crank case is the oil he asked for, as the jars are generally filled prior to his arrival at the filling station.

Another object of my invention is to provide means of dispensing oil that combines the advantages of both wet and dry hose delivery. The oil is delivered under pressure, and yet the delivery hose is emptied by pressure at the completion of each delivery operation.

Another object is to provide means whereby many grades of oil can be delivered through one single hose. A group of oils of varying grades can thereby be merchandized from a single unit.

Another object of my invention is to provide means of discharging many oils through a single hose without mixing the various kinds.

Further objects and advantages are apparent from the following detailed description.

While the invention in its broader aspect is capable of embodiment in various forms, a preferred embodiment thereof, and of the mechanism forming the same, are illustrated in the accompanying drawings in which;

Figure 3:
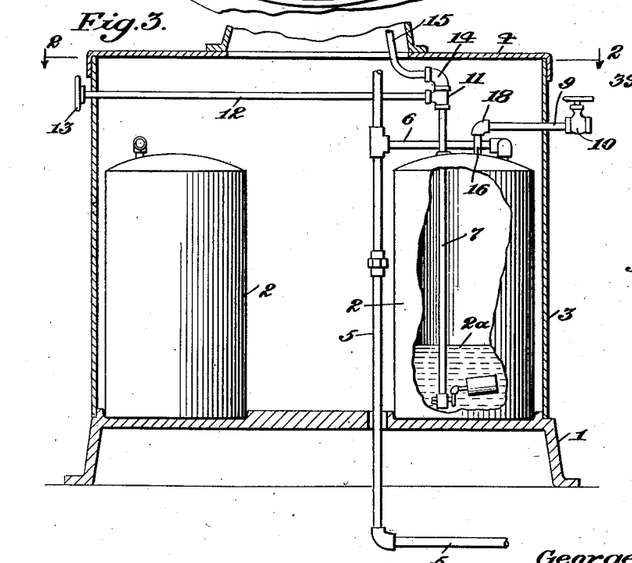
Fig. 3 is a partial section along line 3—3 in Fig. 2 with portions in section and portions left out.

Referring to the drawings 1 (Fig. 3) designates a base plate supporting the mechanism. At spaced intervals thereupon rest tanks 2 which are adapted for storage of lubricating oil. Around the outer periphery of the base plate 1, and supported thereby is a metal shield 3 terminating at its upper end in a cover 4. Each tank 2 is made air tight and compressed air is carried to the top thereof by a pipe 5 shown in the present instance as leading underground from the source of supply and passing up through the base 1, connecting at its upper portion to pipe 6 which is fastened to and passes through the head of the tank 2. Pipe 6 is arranged so that it has an air tight connection to each tank 2, and it will be evident that each tank thereby receives compressed air from pipes 5 and 6. The source of supply of compressed air hereinbefore referred to, can be any air tank supplied by a compressor, but as this air supply is easily understood and forms no part of my present invention, I have not shown it or otherwise described it.

Figure 2:
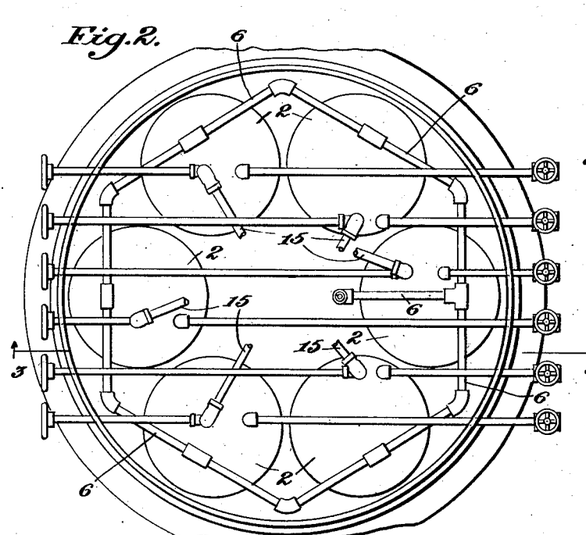
Fig. 2 is a view along line 2—2 in Fig. 3 with the cover plate removed.

Passing through the top of each tank 2 and sealed therein against air leakage are other pipes 7. These carry at their upper ends valves 11, operable for opening and closure by valve stems 12 and handles 13. It is seen from Fig. 2 that these valve stems 12 are of varying lengths. Extending upward from each valve 11 is a fitting 14 and tubing 15.

Other pipes 16 lead out of the top of each tank 2, having at their upper ends fittings 8 into which is screwed one end of each pipe 9, and other ends can be regulated for opening or closure by valves 10. To fill any one tank 2 with oil 2a an oil supply pipe (not here shown) is screwed to the outer end of its valve 10, the valve is opened and oil pumped in at a pressure higher than that of the air in pipes 5 and 6, will flow through pipe 9 and 16, and into the tank. It is evident that during this tank filling operation that air disposed internal of the tank will be displaced by the incoming oil and be forced back into the air supply line through pipes 6 and 5, this type of tank filling operation avoiding the necessity of wasting the compressed air. The means employed to force oil into the tank 2 at this higher pressure could be either a standard hand pump or a motor driven pump, but as these pumps are old in the art and form no part of this invention they have not been shown or otherwise described. It is evident that valves could be easily placed in pipes 5 and 6 so that the supply of air could be shut off and the air disposed internal of the tank could be released then to the atmosphere, permitting filling with oil to be accomplished by merely pouring it through valve 10 and pipe 9. As this would constitute a conventional change in piping and standard procedure, I have not here shown it or otherwise described this optional form of filling.

At the lower end of pipe 7, I have provided an automatic float valve. This float valve consists of a casing 17 screwed onto the lower end of pipe 7, a gasket 18 serving to seal the joint more completely than the threads alone would seal. At the one side of casing 17 projects a clevis lug to which is pivoted at a point intermediate its ends, on a pin 20, a lever 19. The upper end of the lever terminates in a clevis and contains a square hole into which is fitted a square pin 20. Carried in this clevis end, fixed against turning movement is one end of a rod 22. The rod 22 is reduced in diameter at its end opposite the pin 21, and over this reduced diameter is fitted a wood float 23. Washers 24 slip over the rod on its smaller diameter and external the ends of the float, the float being held fixed against endwise movement on the rod 22 by the riveted over end of rod 22.

To the end of lever 19 opposite pin 21, is a pin 25 passing through a hole in a valve retainer 26, which carries a composition valve disc 27. Tapped into retainer 26 and projecting inward therefrom is a rod 28, its other end terminating in a threaded portion on which is carried a second retainer 29 and a second disc 30, spaced between two nuts 31. A valve seat 32 machined in the casing 17 coacts with disc 27, and a seat 33 is formed at one end of a valve cage bushing 34, the two discs contacting on the two seats simultaneously when the float 23 is in the down position shown in Fig. 9, and away from the seats when float is in the raised position of Fig. 11.

It is now evident that when a valve 11 is opened, that oil will flow up that pipe 7 to which that particular valve 11 is operatively connected, and into its associated pipe 15, this operation occurring by reason of the air pressure in its associated tank 2. As oil is passed to pipe 15, additional air will flow into the tank 2 from air supply line 5, to take the place of the withdrawn oil.

Disposed at the top of tank 3 is a delivery casing 35, this being supported on the cover 4. Into a threaded recess at the top of casing 34 is screwed an end of a cylinder 36. At the top end of cylinder 36 is screwed a cylinder 37. Disposed internal of the casing 35 is a cylinder 38. Mounted internal of cylinder 37 and for reciprocation therein is a piston 39. At the top of this piston is a cup leather sealing ring 40 having a conventional split expander ring 41 internal thereof, the rings being fastened to the piston head by a clamp disc 42 and screw 43. Adjacent the wall of cylinder 37 and cast internal therewith, is an air port 44 which unites at its lower end with the top end of air inlet pipe 5. It is evident that when piston 39 is reciprocated upward by means hereinafter disclosed, that air will pass into pipe 5 from internal of cylinder 37 and that when the piston is reversely operated air will pass from pipe 5 into cylinder 37.

The further purpose and operation of piston 39 will be hereinafter more completely described.

The lower end of piston 39 is enlarged in diameter and forms in combination with cup leather ring 46, expander 47, and clamp disc 45 a piston 39a adaptable for reciprocation in cylinder 36. The disc 45 is held to the end of piston 39a by bolts 48. Into the center of disc 45 is screwed the upper end of a hollow tube 49. A top wall of casing 35 forms a closed end for the bottom of cylinder 36. In the center of this closed end is disposed a packing gland having a screwed gland nut portion 51. The tube 49 extends downward through the gland 50 and nut 51 into screwed in relation in a third piston 52. To piston 52 is fastened a disc 53 by bolts 54, these serving to retain the cup leather ring 55 and expander 56. Cylinder 38 has its bottom end closed, an inlet valve 57 being arranged to open when a vacuum is produced internal of cylinder 38 by an upward movement of piston 52 as hereinafter explained more fully. The cylinder 38 is suspended internal of casing 35 by the supporting straps 58. These straps are shown welded to the cylinder and bolted to the casing 35. A spring 59 normally tends to hold valve 57 to its seat formed in the bottom of cylinder 38; the spring abutting between the lower wall of the closed cylinder end, and a washer 60 held on the valve stem by a cotter 61.

Figure 7:
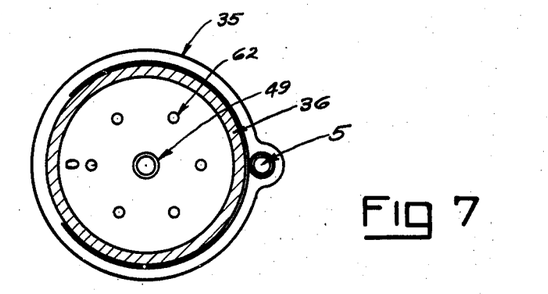
Fig. 7 is a section taken along line 5—5 in Fig. 1.

Spaced radially in the closed bottom of cylinder 36 (Figs. 7 and 1) are a series of holes which are tapped at one end to receive one end of a tubing connector 63. The other end of the connector holds the top end of tube 15. It is now evident that when a valve 11 is opened that oil passes through one of tubes 15 to internal of cylinder 36. As cylinder 36 is thus filled with oil at a pressure equal to that of the air pressing on oil disposed in the tank 2 and as this air pressure is also equal to that in pipe 5 and internal of cylinder 37, it is evident that when piston 39 is pushed upward to the extreme up position shown in Fig. 1 that the air above piston 39 and internal of cylinder 37 will be forced back into air supply line 5. While the pressures on both oil and air are equal, the lower piston head 39a is greater in area than the upper piston 39 internal of cylinder 37, and it will be evident that the total upward pressure of oil in cylinder 36 is greater than the downward pressure of air on piston 39 in the same ratio as the area of the cylinder 36 is to the area of the cylinder 37. As the pistons 39 and 39a are raised by oil entering at one of holes 62 the tube 49 elevates piston 52 in cylinder 38. This upward reciprocation of piston 52 produces a vacuum internal of cylinder 38 and atmospheric air passes through valve 57 from external the cylinder 38 to internal thereof. To prevent the entering oil in cylinder 36 from entering into the hollow tube I have provided a check valve ball 64 pressed against a seat 67, formed in the disc 45, by a spring 65, the spring and ball being held in place by the retainer 66. To permit delivery of the oil internal of cylinder 36 to the crank case or other point of delivery, I have provided a valve 68 (Figs. 1 and 8) having a single port 69. The valve is tapered on its outer periphery and operable for turning movement in a tapered seat bored out in casing 35. A port 70 extends through casing 35, its center portion intermediate its ends being bridged by port 69 in valve 68. The outer end of port 70 terminates in a nozzle 71 to which is fastened one end of a delivery hose 76. The valve 68 is reduced in diameter at its large end to form a stem 72, passing through a cover 73. While the tapered seat of the valve forms a seal against air leaking from port 69 to the atmosphere, yet I have provided a coil compression spring 74 to hold valve to its seat at all times.

Figures 1, 12, 13, 14:
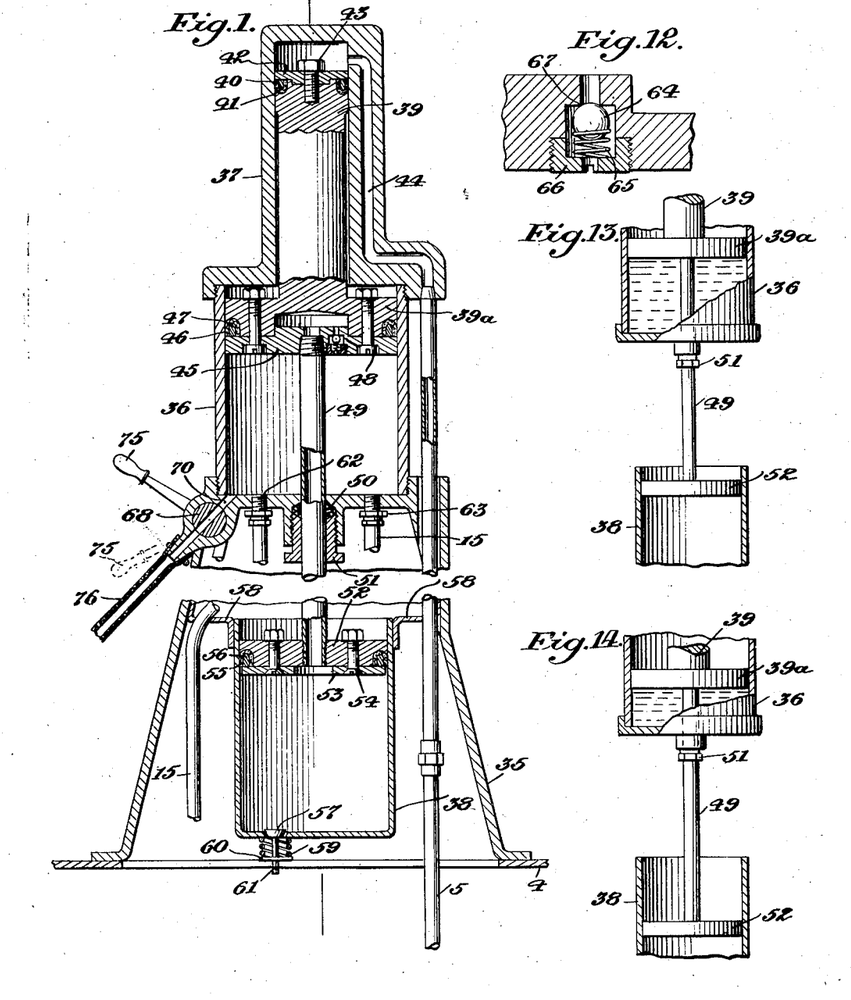
Fig. 1 is a partial section along line 1—1 in Fig. 4 with portions left off and shown broken.
Fig. 12 is an enlarged fragmentary view in section of a check valve in the center pistons shown in Fig. 1.
Figs. 13 to 16 inclusive are diagrammatic views of various operative positions of one of the elements of the mechanism.
Figures 4, 11:
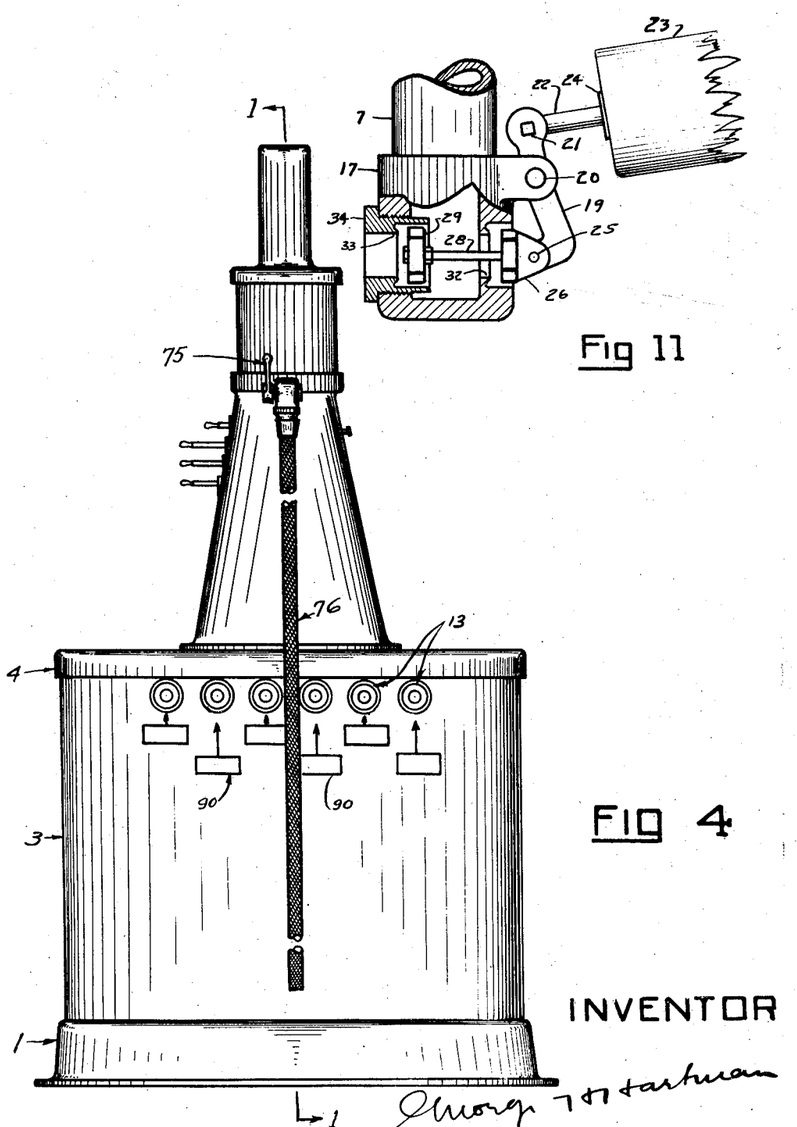
Fig. 4 is a front elevation of the assembled mechanism with portions broken away.
Fig. 11 is a view of the mechanism shown in Fig. 9 with the mechanism in a different operative position, portion being removed and in section.
Figures 8, 9, 10:
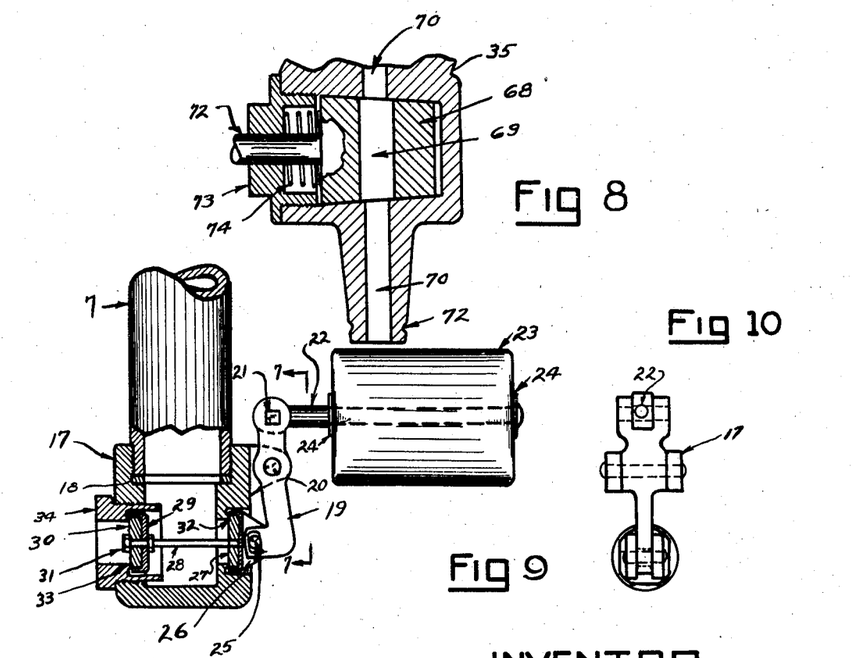
Fig. 8 is a section taken along line 6—6 in Fig. 1.
Fig. 9 is an enlarged fragmentary view of the automatic shut-off means with portions removed and in section.
Fig. 10 is a view of a portion of the mechanism taken along the line 7—7 in Fig. 9 with portions removed.
Figure 15:
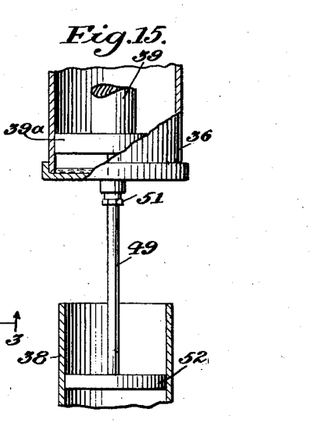
Figure 16:
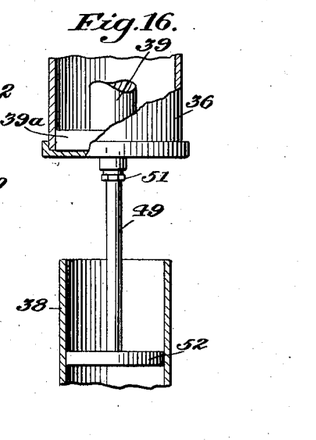

At the outer end of stem 72 is fastened for movement therewith one end of a lever 75 (Figs. 4 and 1). It is evident now that when valve wheel 13 is turned to shut off valve 11 and valve 69 is revolved to open position as shown in Figs. 1 and 8, that oil disposed internal of cylinder 36 will start to flow out of port 70, into hose 76 and thence to point of delivery. As delivery of oil starts through port 70, compressed air internal of pipe 5 will pass up into cylinder 37 and force pistons 39 and 39a downward to drive all the oil out through port 70. The downward movement of the piston 39, lowers piston 52 in cylinder 38, and entrapped air internal of cylinder 38 is forced upward through the hollow tube 49, past check valve ball 64 into cylinder 36. As piston 39a continues to lower, more air will pass through tube 49 and more air pocket above surface of the remaining oil internal of cylinder 36. This is shown by referring to Fig. 13 showing the start of an oil delivery operation, Fig. 14 when delivery of approximately ½ is made, and where the air pressure in cylinder 38 is just about ready to open check valve. Fig. 15 shows the delivery operation approximately ¾ completed and where a greater portion of the air internal of cylinder 38 at the start of the delivery operation has been passed into cylinder 36. Fig. 16 shows a completed delivery where all the air has been sent through hose 76 to effect a cleaning thereof.

Assuming the bore of cylinder 37 to be 3″ and that of cylinder 36 to be 7″ and the air pressure in pipe 5 to be 100# to the square inch. Piston 39 at its top has an area of 7.0686 sq. in. with a total pressure incident to the air in pipe 5 of 706.86 lbs. This load is then applied to the top of oil in cylinder 36, which has an area of 38.485 sq. in. as 706.86 divided by 38.485 or approximately 18.3 lbs. per sq. in. This pressure will drop as soon as delivery of oil starts out through valve 68, due to piston 52 descending in cylinder 38. Assuming the diameter of cylinder 38 to be 6″, its area would be 28.27 square inches. This area added to the area of the piston 39a, would be 66.755 sq. inches. This divided into 706.86 would be approximately 10.6 lbs. per square inch minimum pressure on the oil during delivery—for each 100 lbs. of air on the piston 39. In other words, the oil delivery pressure would start at 18.3 lbs. per square inch and fall to a minimum of approximately 10.6 lbs. per square inch. It is evident that air pressure in cylinder 38 must be brought to substantially that of oil in cylinder 36 before it can pass valve ball 64. The diameter of rod 49, or tension of spring 65, has not been considered in these approximate calculations.

Figures 5, 6, 17:
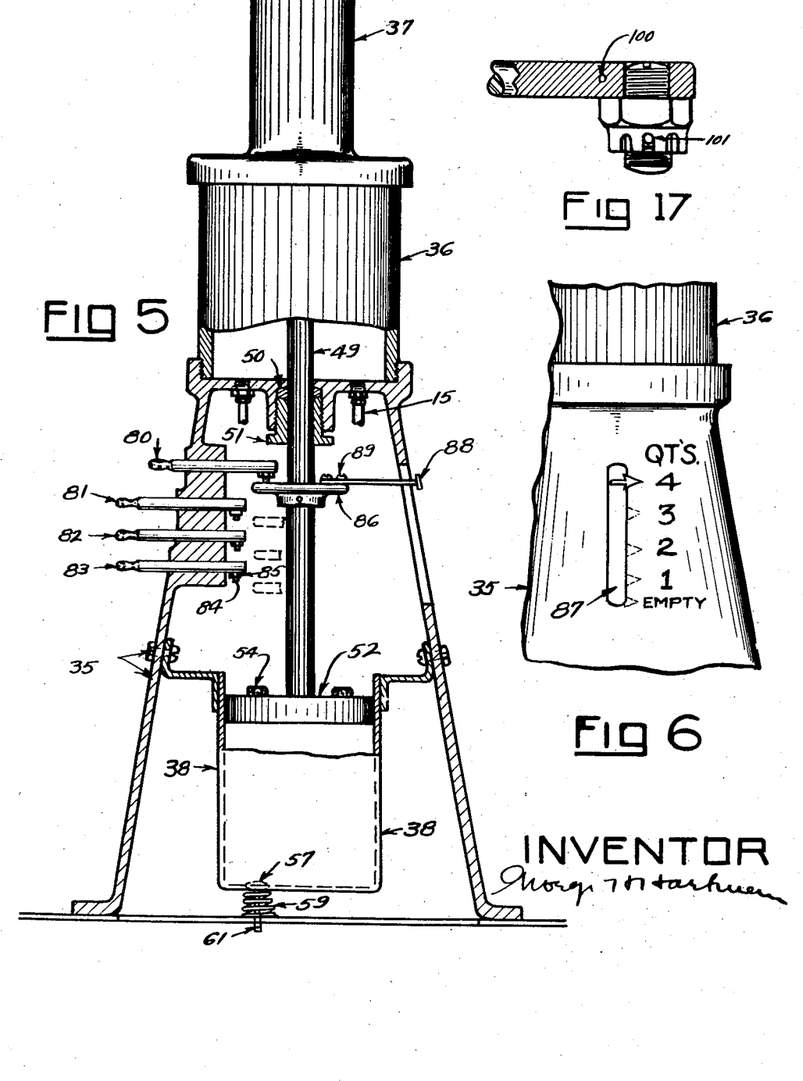
Fig. 5 is a partial section along line 4—4 in Fig. 1.
Fig. 6 is a fragmentary portion of the side of the upper portion of the mechanism that contains the indicating means.
Fig. 17 is an enlarged fragmentary view of a portion of the measuring mechanism.

In order to vary the amount of oil delivered, making delivery of say 1, 2, 3, or 4 quarts as the customer may wish, I have provided four sliding stop rods 80, 81, 82, and 83. These are formed with handles at their outer ends. They pass through and are retained for sliding movement in spaced holes passing through one side of housing 35. Fig. 5 At their inner end is a screw 84 and a lock nut 85. Mounted over the tube 49 and fastened thereon for reciprocation therewith is a flange 86. Projecting out through a slot 87 in the side of casing 35 is a pointer 88, its outer end being shaped into an indicating arrow and its inner end being held by screws 89 to flange 86. It is evident that as oil is passed through a tube 15 into cylinder 36 that pistons 39a and associated tube 49 will be elevated to the position indicated as one quart in Fig. 6, providing bar 83 is moved into interfering relation to flange 86, and that the two quart position will be obtained if bar 82 is brought to interfering relation to flange 86.

It is evident that various alarm signals could be used to indicate arrival of flange 86 at these respective elevated positions, but as these alarms form no part of my present invention I have not shown them or otherwise described them.

The operation of the device is as follows: A customer orders a certain quantity of a certain grade of oil. Each valve wheel 13 (Fig. 4) carries beneath it the name and grade of the oil that it is the tank 2 it controls. This grade and name can be painted in the squares 90 shown under the wheels 13 in Fig. 4.

Handles 80, 81, 82, or 83 as the case may be, are set so that the flange 86 will be limited in its upward travel, to bring just the amount of oil the customer needs, to within cylinder 36. The proper wheel 13 is now turned and the desired grade of oil starts to flow out of its tank 2, through its associated tube 15, to internal of cylinder 36. Air now flows into the tank from pipe 5, to take the place of the oil. The piston 39a then elevates until the flange 86 coacts with the particular stop bar 80, 81, 82, or 83 that may be set for interfering relation. The customer by watching the arrow indicator can see that proper measure is being given him. The proper setting of screws 84 and 85 can be made by a sealer of weights and measures and the location sealed so that accuracy of measurement is guaranteed. A wire and seal, not shown, can be inserted and sealed through hole 100 in bars 80 to 83 inclusive and the hole 101 in nuts 85, see Fig. 17. Valve handle 75 is now moved to open valve 68 to cause ports 69 and 70 to register, whereupon oil within the cylinder 36 is forced by the air pressure internal of cylinder 37, out through hose 76 into crank case of the engine or other container the customer may have. Incident to this oil delivery operation, piston 52 first sucks in a charge of free atmospheric air and then discharges the air into cylinder 36 so that first oil and then air is discharged into the customers container, the purpose of the air being that of impelling the last bit of oil through hose 76 under pressure. This method of cleaning the hose makes a rapid delivery of oil under pressure, and at the completion of delivery the hose is dry and substantially free from oil, except that that may adhere to the side walls of the hose. It will be evident that if the bore of the hose is kept as small as possible, that the last oil in leaving the hose will act as a piston, with the air from cylinder 38 acting as a separate pressure means to its best advantage. Also that the air volume of cylinder 38 at the smallest oil delivery of one quart and under the pressure incident to cylinder 37 must be of sufficient volume at this pressure to at least substantially fill the hose 76. Also that the length of hose and size of hose will therefore affect this relative size of air cylinder 38 needed.

As soon as any of the tanks 2 have become substantially emptied, the float 23 will lower and close the valve formed by discs 27 and 30 preventing the high pressure air of line 5 from passing into cylinder 36. To refill tank 2 with oil I have provided in the present instance a pipe 16, fitting 18, pipe 9, and valve 10. A tank of oil is moved to contact with and connected to the valve 10 through a suitable pump, not shown, and oil is pumped in through the then opened valve 10 and pipes 9 and 16 into tank 2, this displacing the air internal of the tank and forcing it back into supply line 5.

I wish it understood that the particular form of mechanism with which I have clothed my invention and the different parts thereof illustrated and described, are merely a typical method of carrying my invention into effect, and that the specific construction described herein is merely by way of illustration, and not by limitation or narrowing of my claims, as obviously, changes in constructions and design can be made without departing from my invention and such changes are contemplated by me, and would not involve any departure from my invention.

Having thus described my invention, what I claim as new and desire to secure by Letters Patent is:

1. In a device of the character described, oil storage means, a delivery device connected therewith, which includes a cylinder, a piston therein adaptable for reciprocatory pumping movement, a discharge conduit, means for delivery of air through the discharge conduit at each delivery operation of the delivery device, and means for operating the delivery device.

2. In a device of the class described, a first cylinder having a plurality of valve controlled inlets and one outlet, a first piston operable for reciprocation therein, means to reciprocate the piston, a hollow rod connected at one of its ends to the first piston, its other end passing through the first cylinder and connecting to a second piston arranged for reciprocation in a second cylinder when movement is applied to it by operation of the first named piston, an inlet valve in the second cylinder, and an outlet valve in the first piston, reciprocation of the second piston first sucking in atmospheric air through the last named inlet valve and when reversely operated discharging the air through the hollow rod and the last named outlet valve into the first cylinder and out the first named outlet.

3. A dispensing device, including a plurality of storage tanks for storing different kinds of liquids, a single hose, common pump means for delivering measured amounts of liquid from any selected one of the plurality of tanks through the hose and operating means for the delivery means and means for cleaning said hose after delivery of liquid therethrough.

4. An oil dispensing device, including a plurality of oil storage tanks, a single hose, means for delivering measured amounts of oils from any selected tank through the hose, operating means for the delivery means said delivery means operating at the completion of the delivery of each measured amount of oil to blow out the hose.

5. An oil dispensing device comprising a plurality of oil storage tanks, a single hose, fluid operated means for delivering measured amounts of oil from any selected tank through the hose, operating means for the delivery means, including means to entrap a quantity of atmospheric air at the beginning of each delivery operation, for discharge through the hose at the completion of each said operation.

6. In a device of the class described, a plurality of oil storage tanks, an oil delivery device which includes a single delivery hose, means to operate the delivery device, so that first one and then another of the storage tanks are operatively connected with the delivery device, for delivery of oil through the single delivery hose, said delivery device including mechanism to build up a charge of air under pressure at each operation thereof, for discharge through the hose at the completion of each delivery operation.

7. An oil dispensing device comprising a plurality of oil storage tanks, an oil delivery device, including a single hose, pneumatic means to force oil from a selected tank to the delivery means, separate pneumatic operated means to force oil from the delivery device out through the hose, the mechanism being arranged so that none of the compressed air incident to these pneumatic delivery operations escapes to the atmosphere.

8. In a device of the class described, a plurality of oil storage tanks oil delivery means involving a single delivery hose, compressed air means operable to force oil from a selected tank to the delivery means, separate compressed air operated means to force the oil from the delivery means out through the single hose, each storage tank becoming filled with compressed air incident to a series of delivery operations, a source of compressed air supply and piping arranged to permit pumping of new oil into the tanks, the compressed air disposed internal of the tanks being then forced back into the compressed air supply source without loss to the atmosphere.

9. An oil dispensing device, including a plurality of oil storage tanks, a single hose, means for delivering predetermined variable amounts of oil from any selected tank through the hose, fluid pressure operating means for the delivery means said delivery means operating at the completion of the delivery of each measured amount of oil to blow out the hose.

10. A liquid dispensing device including a plurality of liquid storage tanks, a single liquid outlet, means for delivering liquids from any selected one of said liquid storage tanks through said liquid outlet, operating means for the delivery means, said delivery means operating at the completion of the delivery of each quantity of liquid to blow out the liquid outlet.

11. A liquid dispensing device including a liquid storage tank, a liquid outlet, means for delivering liquid from said tank to said liquid outlet, said delivery means operating at the completion of the delivery of the liquid to clean out the liquid adhering to the interior surface of the liquid outlet.

12. A liquid dispensing apparatus including a liquid storage tank, a discharge device, a conduit leading therefrom, means for delivering liquid from said tank through said discharge device and conduit and means operable at the completion of each liquid delivery through said conduit to remove the liquid adhering to the interior surface of said conduit after such delivery.

13. A liquid dispensing apparatus including a liquid storage tank, a discharge device, a conduit leading therefrom, means for delivering liquid from said tank through said discharge device and conduit and automatic means operable at the completion of each liquid delivery through said conduit to remove the liquid adhering to the interior surface of said conduit after such delivery.

14. A liquid dispensing apparatus including a liquid storage tank, a discharge device leading therefrom, means for delivering liquid from said tank through said discharge device and means operable at the completion of each liquid delivery through said device for sending a charge of air through the device.

15. A liquid dispensing apparatus including a liquid storage tank, a measuring device, a discharge conduit leading therefrom, means for delivering liquid from said tank through said measuring device and discharge conduit in predetermined quantities and means operable at the completion of each liquid delivery through said conduit to remove the liquid adhering to the interior surface of said conduit after such delivery.

16. A liquid dispensing apparatus including a liquid storage tank and a measuring device, a discharge conduit leading therefrom, means for delivering liquid from said tank through said discharge conduit in measured quantities and means automatically operable at the completion of each liquid delivery through said conduit to remove the liquid adhering to the interior surface of said conduit after such delivery.

17. In an apparatus for dispensing fluids, a plurality of storage tanks for the fluids, a discharge device, a conduit for delivering fluids therefrom, means for passing a selected one of said fluids to said discharge device and means automatically operated after the passing of such fluid through said conduit to clean out the conduit of any fluid remaining in the conduit.

In testimony whereof I hereby affix my signature.

GEORGE H. HARTMAN.